Figure 1:
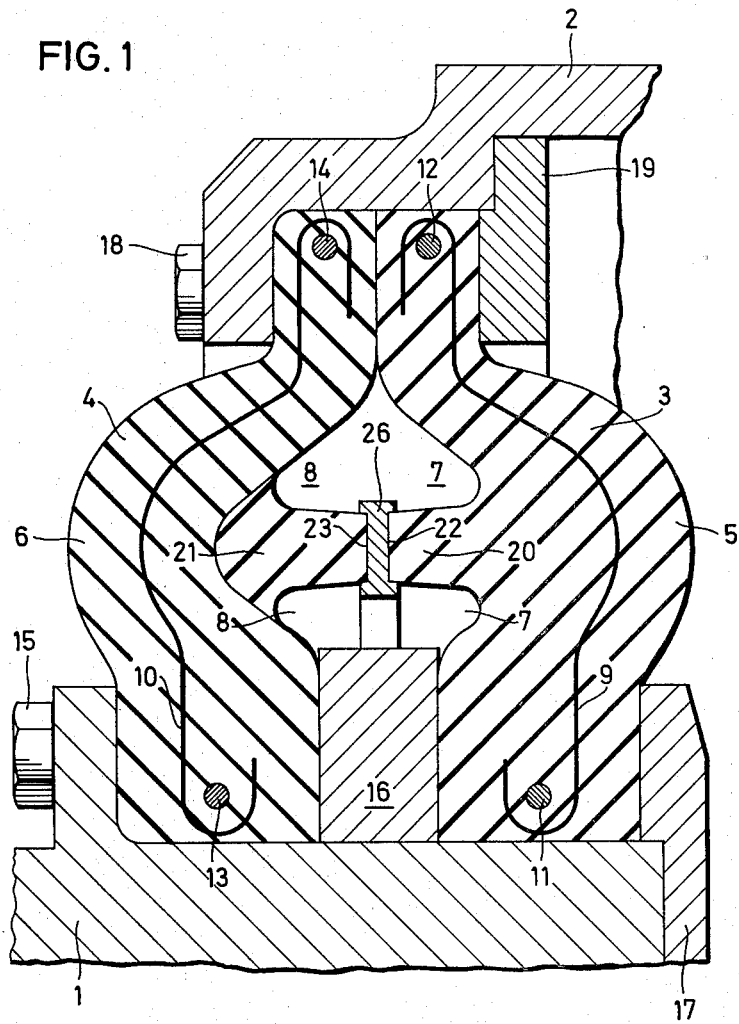

United States Patent [19]

Walter

[11] 4,249,394
[45] Feb. 10, 1981

[54] FLEXIBLE SHAFT COUPLING

[75] Inventor: Jürgen Walter, Haltern-Hullern, Fed. Rep. of Germany

[73] Assignee: Hackforth GmbH & Co. KG, Herne, Fed. Rep. of Germany

[21] Appl. No.: 24,252

[22] Filed: Mar. 27, 1979

[30] Foreign Application Priority Data

Jan. 13, 1979 [DE] Fed. Rep. of Germany ....... 2901219

[51] Int. Cl.³ .......................... F16D 3/17; F16D 3/28; F16D 3/52
[52] U.S. Cl. ..................................... 64/11 R; 64/1 V; 64/27 NM
[58] Field of Search .................. 64/11 R, 27 NM, 1 V

[56] References Cited

U.S. PATENT DOCUMENTS

| 2,186,305 | 1/1940 | Orr | 64/11 R |
| 2,816,424 | 12/1957 | Vorthmann | 64/11 R |
| 3,020,737 | 2/1962 | Firth | 64/11 R |
| 3,199,313 | 8/1965 | Paulsen | 64/11 R |
| 3,457,731 | 7/1969 | Wellauer et al. | 64/11 R |
| 3,524,332 | 8/1970 | Callies | 64/11 R |
| 3,545,231 | 12/1970 | Downey | 64/11 R |
| 3,727,429 | 4/1973 | Downey | 64/11 R |
| 3,747,366 | 7/1973 | Rüggen et al. | 64/11 R |
| 4,067,207 | 1/1978 | Böhm et al. | 64/11 R |

Primary Examiner—Henry K. Artis
Attorney, Agent, or Firm—Toren, McGeady and Stanger

[57] ABSTRACT

A flexible shaft coupling comprises a rigid hub coupling part and a rigid ring coupling part which surrounds the hub part concentrically, the two parts being connected together by two similar symmetrically disposed resilient rings which bulge outwards away from each other to form a cavity between them. In order to vary the resilience of the coupling to suit requirements and avoid torsional oscillations, the outwardly bulging parts of the resilient rings are supported against each other by a resiliently deformable annular element which extends axially across, but does not fill, the cavity.

6 Claims, 3 Drawing Figures

FLEXIBLE SHAFT COUPLING

This invention relates to flexible shaft couplings comprising a rigid hub coupling part and a rigid ring coupling part, which surrounds the hub part concentrically, the two parts being connected together by two similar symmetrically disposed resilient rings which bulge axially outwards away from each other to form a cavity between them, the resilient rings being clamped at their inner peripheries to the hub part and at their outer peripheries to the ring part and having reinforcing inlays for transmitting torgue between the clamped peripheries.

The torsional elasticity of such couplings depends firstly upon the resistance to change of shape of the outwardly bulging parts of the resilient rings and of the correspondingly bulging reinforcing inlays embedded in them, and secondly upon the strain or extension of the embedded reinforcing filaments forming the inlays. A disadvantage of such couplings is that the torsional elasticity of couplings of a given overall size can be varied only within very narrow limits and with considerable difficulty. The object of the present invention is, in order to overcome this disadvantage, so to construct a flexible shaft coupling as described above that the torsional elasticity of couplings of similar basic construction and the same overall size can be made different from each other by simple means.

To this end, according to this invention, the outwardly bulging parts of the resilient rings are supported against one another by a resiliently deformable annular element which extends axially across, but does not fill, the cavity.

The annular element increases the deformation resistance of the resilient rings to an extent which is dependent upon the form and dimensions of the element and also upon the material of which it is made. The element thus forms an auxiliary means for influencing within comparatively wide limits and in a simple manner the elasticity of the outwardly bulging resilient rings of the coupling both in an axial and in a rotational direction.

The parts of the cavity not occupied by the annular element serve as a displacement chamber for the parts of the resilient rings and of the elastic annular element which are upset or squeezed inwards when the coupling is in operation. Moreover, these parts of the cavity offer the particular adtantage that the radial flexibility of the bulging resilient rings is largely retained.

For the computation and design of couplings for drives which are subject to torsional oscillations, additional means are thus made available for determining the torsional elasticity of the coupling and also its internal damping.

The annular element may consist of a single ring held under axial compression between the resilient rings or of a two-part ring, the parts of which bear against one another in a central plane perpendicular to the axis of the coupling. Preferably, however, the ring forming the element is bonded to parts of the resilient rings.

A further way of influencing the axial stiffness of a two-part resilient annular element is by providing depressions or hollows in the mutually facing surfaces or ends of the annular parts of the element.

Relative circumferential displacements between the contacting end faces of the annular parts of the element can be prevented by the introduction between the parts of a relatively rigid guide ring of metal or plastics material. This is provided with flange-like axial projections which emcompass the ends of the annular parts at both their inner and outer peripheries.

Figure 2:
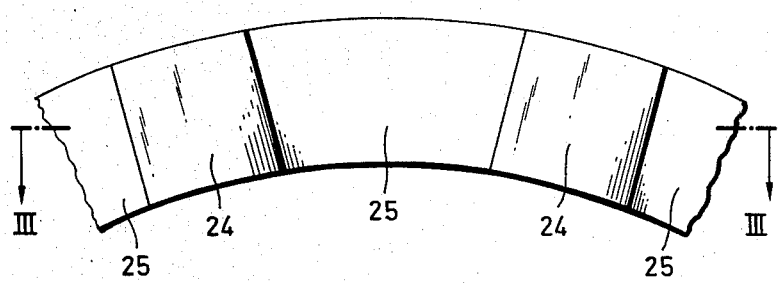

Two examples of couplings in accordance with the invention are illustrated diagrammatically in the accompanying drawings in which:

FIG. 1 is a radial section through one example;
FIG. 2 is an elevation of part of an end face of resilient annular element of a second example; and
FIG. 3 is a section along the line III—III of FIG. 2 showing the end of one part of the two-part element.

The shaft coupling illustrated in FIG. 1 comprises a rigid hub part 1, which in use is fixed on the end of one shaft, a rigid ring part 2, which surrounds the hub part 1 concentrically, and, in use, is fixed on a second shaft, and two resilient rings 3 and 4 which resiliently connect together the two rigid coupling parts 1 and 2. The resilient rings 3 and 4 are of rubber or of other elestomeric material and bulge axially outwards away from each other in order to increase their resilience and form a cavity 7, 8 between them. Reinforcing inlays 9,10 are embedded in the elastomeric material of the resilient rings 3, 4, the outer and inner peripheries of the inlays being bent around edge stiffening rings 11, 12 and 13, 14 respectively, which are also embedded in the elastomeric material. The inlays are anchored to the rings 11, 12 and 13,14 in a manner to resist tension. The inner peripheries of the resilient rings 3,4 are firmly clamped by bolts 15 between an outer flange and a clamping ring 17 of the hub part 1 with an intermediate ring 16 between them. In a corresponding manner, the outer peripheries of the resilient rings 3,4 are clamped by means of bolts 18 between an inner flange and a clamping ring 19 or of the rigid ring 2.

The coupling which, as described thus far, is conventional, is characterised in that the outwardly bulging parts 5, 6 of the resilient rings 3, 4 are supported against each other by cylindrical elastic element parts 20, 21. The parts 20, 21 can, as shown at the left in FIG. 1, be inserted as separate rings in an axially compressed state between the resilient rings 3, 4 or, as shown at the right, can be bonded, for example by vulcanizing, to the resilient rings 3,4.

Figure 3:
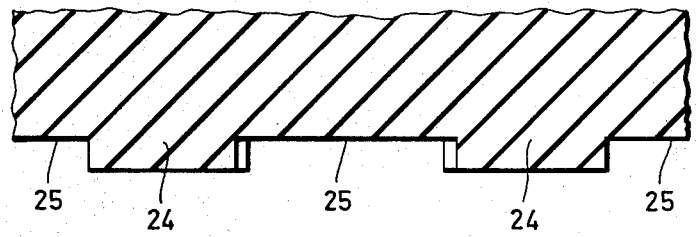

The free end faces of the annular element parts 20, 21 may bear against each other with flat surfaces 22, 23 or with surface parts 24 spaced apart by recesses or depressions 25 as shown in FIGS. 2 and 3. The surfaces 22, 23 or 24 may bear against each other either directly or through an interposed guide ring 26. Flange-like axial projections of the peripheries of the ring 26 prevent radial displacement of the annular element parts 20, 21 relative to each other.

I claim:

1. In a flexible shaft coupling comprising a rigid hub coupling part, a rigid ring coupling part, which surrounds said hub part concentrically, two similar symetrically disposed resilient rings connecting said hub part to said rigid ring coupling part, said resilient rings bulging axially outwards away from each other to define a cavity there between, means clamping said resilient rings at the inner peripheries thereof to said hub part, means clamping said resilient rings at the outer peripheries thereof to said rigid ring coupling part and reinforcing inlays imbedded in said resilient rings for transmitting torque between said inner and outer peripheries, the improvement comprising a resiliently deformable annular element which extends axially across, but does not fill, said cavity, said resiliently deformable annular element supporting said outwardly bulging parts of said resilient rings against each other.

2. A shaft coupling as claimed in claim 1, wherein said annular element comprises a separate single-piece ring and means holding said single-piece ring under axial compression between said resilient rings.

3. A shaft coupling as claimed in claim 1, in which said annular element comprises a two-part ring, said two-part ring comprising a first part and a second part, said first part and said second part bearing against each other in a central plane perpendicular to an axis of rotation of said coupling.

4. A shaft coupling as claimed in claim 3, in which said first part and said second part of said two-part ring are bonded one to each of said resilient rings.

5. A shaft coupling as claimed in claim 3, in which said first and second parts include end faces and means defining recesses in said end faces, said recesses separating parts of said end faces, said parts of said end face of said first part bearing against said parts of said end face of said second part.

6. A shaft coupling as claimed in claim 3, further comprising a relatively rigid guide ring, said guide ring including flange-like axial projections and said first part bearing against said second part through said guide ring with said flange-like axial projections encompassing end faces of said first part and said second part.

* * * * *